US007424623B2

(12) United States Patent
Du et al.

(10) Patent No.: US 7,424,623 B2

(45) Date of Patent: Sep. 9, 2008

(54) PERSONAL COMPUTER INTEGRATED WITH PERSONAL DIGITAL ASSISTANT

(75) Inventors: Sterling Du, Palo Alto, CA (US); Bruce Denning, Monterey, CA (US); James Lam, Fremont, CA (US)

(73) Assignee: O2 Micro International Limited, Grand Cayman (KY)

(*) Notice: Subject to any disclaimer, the term of this patent is extended or adjusted under 35 U.S.C. 154(b) by 1320 days.

(21) Appl. No.: 10/164,361

(22) Filed: Jun. 6, 2002

(65) Prior Publication Data

US 2003/0187775 A1 Oct. 2, 2003

Related U.S. Application Data

(63) Continuation-in-part of application No. 10/108,768, filed on Mar. 28, 2002, now Pat. No. 7,343,484.

(51) Int. Cl.
*G06F 1/00* (2006.01)
*G06F 9/00* (2006.01)
*G06F 1/26* (2006.01)

(52) U.S. Cl. .............................. 713/300; 713/1; 713/2; 713/320

(58) Field of Classification Search ..................... 713/2, 713/320, 300
See application file for complete search history.

(56) References Cited

U.S. PATENT DOCUMENTS 5,142,680 A 8/1992 Ottman et al. ............. 395/700
5,200,913 A 4/1993 Hawkins et al. ............. 364/708
5,375,076 A 12/1994 Goodrich et al. ......... 364/708.1
5,566,349 A 10/1996 Trout ........................ 395/840
5,600,800 A 2/1997 Kikinis et al. ............... 395/281
5,699,244 A 12/1997 Clark, Jr. et al. ............ 364/420
5,708,840 A 1/1998 Kikinis et al. ............... 395/800
5,797,089 A 8/1998 Nguyen ...................... 455/403
5,969,529 A 10/1999 Eiraku et al. ................ 324/433
5,983,073 A 11/1999 Ditzik ....................... 455/11.1
6,018,724 A 1/2000 Arent ......................... 705/44
6,034,621 A 3/2000 Kaufman ............... 340/825.44
6,055,643 A 4/2000 Chaiken ..................... 713/323
6,088,730 A 7/2000 Kato et al. .................. 709/227
6,101,562 A 8/2000 Chang et al. .................. 710/73
6,141,052 A 10/2000 Fukumitsu et al. .......... 348/373
6,151,012 A 11/2000 Bullister ..................... 345/168
6,154,359 A 11/2000 Kamikakai et al. .......... 361/681
6,173,417 B1 1/2001 Merrill ........................ 714/15
6,175,917 B1 1/2001 Arrow et al. ................... 713/1
6,178,503 B1 1/2001 Madden et al. ................ 713/2
6,233,464 B1 5/2001 Chmaytelli ................. 455/556
6,240,550 B1 5/2001 Nathan et al. ................. 717/11
6,259,597 B1 7/2001 Anzai et al. ................. 361/683
6,272,575 B1 8/2001 Rajchel ...................... 710/102
6,298,107 B1 10/2001 Mullins ...................... 375/377
6,304,261 B1 10/2001 Shields et al. ............... 345/358

(Continued)

*Primary Examiner*—Rehana Perveen
*Assistant Examiner*—Stefan Stoynov

(57) ABSTRACT

A personal computer (PC) adapted to function as a personal digital assistant (PDA) includes: a central processing unit (CPU) responsive to a control signal to load a first operating system or a second operating system, wherein the first operating system is run by the PC in a first PC mode and the second operating system is run by the PC in a second PDA mode. Various software application programs that may be run in PDA mode include Internet auction applications, electronic mail access applications, and Internet radio applications.

31 Claims, 8 Drawing Sheets

700
POWER DOWN PC 702
PC OFF OR LOW POWER STATE 704
AUTOMATICALLY WAKE UP PC IN PDA MODE 706
ANY E-MAIL MESSAGES ? 708
NO
YES
RECEIVE MESSAGES 710
NOTIFY USER 712

U.S. PATENT DOCUMENTS 6,310,634 B1 10/2001 Bodnar et al. ............... 345/854
6,311,282 B1 10/2001 Nelson et al. ............... 713/324
6,334,149 B1 12/2001 Davis, Jr. et al. ............ 709/219
6,336,142 B1 1/2002 Kato et al. .................. 709/227
6,356,905 B1 3/2002 Gershman et al. ............. 707/10
6,367,074 B1 * 4/2002 Bates et al. .................... 713/2
6,400,810 B1 * 6/2002 Skladman et al. ........... 709/207
6,631,469 B1 * 10/2003 Silvester ........................ 713/2
2001/0028562 A1 10/2001 Naghi ......................... 362/85
2001/0039528 A1 11/2001 Atkinson et al. .............. 705/37
2002/0007338 A1 1/2002 Do ............................. 705/37
2002/0140723 A1 * 10/2002 Ageta et al. ................. 345/727

* cited by examiner

200
CPU
203
HOST BRIDGE
208
SYSTEM MEMORY
206
SYSTEM BRIDGE
210
VIDEO SUBSYSTEM
218
232
AUDIO SUBSYSTEM
220
234
MANUAL INPUT DEVICE CONTROLLER
242
MANUAL INPUT DEVICE(S)
209
HARD DISK DRIVE(S)
240
CD/DVD ROM DEVICE(S)
224
PERIPHERAL EXPANSION BUS
244
PCI BUS
204
SMALL LCD MODULE
214
IC
202
FLASH CARD CONTROLLER
226
NETWORK CONTROLLER
228

740
POWER DOWN PC
702
PC OFF OR LOW POWER STATE
704
AUTOMATICALLY WAKE UP PC IN PDA MODE
706
ANY E-MAIL MESSAGES ?
708
NO
YES
RECEIVE MESSAGES
710
ON APPROVED SENDER LIST ?
718
NO
YES
NOTIFY USER
720

PERSONAL COMPUTER INTEGRATED WITH PERSONAL DIGITAL ASSISTANT

CROSS REFERENCE TO RELATED APPLICATIONS

This application is a continuation-in-part application of application Ser. No. 10/108,768, filed Mar. 28, 2002 now U.S. Pat. No. 7,343,484, the teachings of which are incorporated herein by reference.

FIELD OF THE INVENTION

This invention relates to Personal Computers (PCs) and Personal Digital Assistants (PDAs), and more particularly to a PC integrated with PDA functionality permitting a PC to operate in both a PC mode and a PDA mode.

BACKGROUND OF THE INVENTION

Personal Digital Assistants (PDAs) are growing in popularity especially among business travelers. There are a variety of PDAs on the market today that provide a variety of functions. Most PDAs manage personal information and, as such, perform such tasks as: storing contact information such as names, addresses, phone numbers, email addresses, etc.; writing memos or personal notes; keeping track of appointments; reminding a user of appointments, e.g., by audio alarm; planning projects; keeping track of expenses; and the like. In addition, some PDAs are also able to send and receive email, provide Internet access, play MP3 music files, play MPEG movie files, provide voice recording functionality, and provide other functionality.

A PC can also provide all the above PDA functions, where a PC includes a desktop computer or a laptop computer. However, compared to a PC, a PDA is smaller and lighter. As such, it is typically powered by small batteries, e.g., some models use alkaline (AAA) batteries. A PDA's size also enables it to be used practically anywhere. Compared to a PC, a PDA has a fast boot up sequence enabling it to be used within a couple of seconds after turning its power on. In addition, a PDA typically has simpler user input devices than a PC. For instance, PDA applications typically require activation of only a few buttons and don't require a larger, more detailed input device such as a keyboard.

Compared to a PC however, a PDA has several limitations. First, PDAs can be as expensive as a low end PC. Second, PDAs have relatively limited storage capacity given their size, e.g., PDAs cannot support high capacity storage devices such as a hard disk drive. Third, PDAs have limited input devices. For instance, most PDAs include a stylus and touch screen that lets a user launch programs by tapping on the screen with a pen-like stylus. This limits user input speed and makes it difficult to put long messages into the PDA. Fourth, PDAs have limited expansion capability. For instance, flash media card readers and certain universal serial bus (USB) connections may not be supported.

In other words, the advantages of the PDA are normally the drawbacks of a PC and vice versa. Accordingly, there is a need in the art for a PC that overcomes the above deficiencies in the prior art and can provide a PC integrated with PDA functionality that permits a PC to operate in both a PC mode and a PDA mode.

BRIEF SUMMARY OF THE INVENTION

A personal computer (PC) adapted to function as a personal digital assistant (PDA) consistent with the invention includes: a central processing unit (CPU) responsive to a control signal to load a first operating system or a second operating system, wherein the first operating system is run by the PC in a first PC mode and the second operating system is run by the PC in a second PDA mode, and wherein the PC operating in the PDA mode operates PDA software applications, wherein the PDA software applications are software applications selected from the group consisting of: Internet access applications, wireless Internet access applications, scheduling applications, address book applications, storage software applications, voice recording applications, Internet auction applications, electronic mail access applications, and Internet radio applications.

A method of automatically monitoring a plurality of third party bids in an on-line auction consistent with the invention includes the steps of: setting a target price; monitoring the plurality of third party bids automatically; comparing each of the plurality of third party bids to the target price; and notifying a PC user if one of the plurality of third party bids exceeds the target price.

Another method of automatically monitoring a plurality of third party bids in an on-line auction with a personal computer (PC) capable of operating in either a first PC mode or a second personal digital assistant (PDA) mode consistent with the invention includes the steps of: initiating a control signal; operating a second operating system in response to the control signal, wherein the second operating system operates the PC in the second PDA mode; accessing an Internet auction portal; setting a target price for a select auction; monitoring the plurality of third party bids automatically in the PDA mode; comparing each of the plurality of third party bids to the target price; and notifying a PC user if one of the plurality of third party bids exceeds the target price.

Another method of automatically monitoring a plurality of incoming electronic mail messages at a PC, wherein the PC is configured to operate in at least a first power state and a second power state, wherein the PC consumes less power in the second power state than the first power state, and wherein the PC is initially in the second power state, the method consistent with the invention including the steps of: waking up the PC automatically from the second power state to the first power state; checking for any of the plurality of incoming electronic mail messages; receiving any of the plurality of incoming electronic mail messages; and providing notice indicating receipt of any of the plurality of incoming electronic mail messages.

Another method of automatically monitoring a plurality of incoming electronic mail messages with a personal computer (PC) capable of operating in either a first PC mode or a second personal digital assistant (PDA) mode, wherein the PC is configured to operate in at least a first power state and a second power state, wherein the PC consumes less power in the second power state than the first power state, and wherein the PC is initially in the second power state, the method consistent with the invention including the steps of: initiating an automatic control signal to wake up the PC from the second power state to the first power state; operating a second operating system based on the control signal, wherein the second operating system operates the PC in the second PDA mode; checking for any of the plurality of incoming electronic mail messages; receiving any of the plurality of incoming electronic mail messages; and providing notice indicating receipt of any of the plurality of incoming electronic mail messages while the PC is in the PDA mode.

Another method of accessing an Internet radio broadcast station with a PC capable of operating in either a first PC mode or a second PDA mode, wherein the PC is configured to operate in at least a first power state and a second power state, wherein the PC consumes less power in the second power state than the first power state, and wherein the PC is initially in the second power state, the method consistent with the invention including the steps of: initiating a control signal to wake up the PC from the second power state to the first power state; operating a second operating system in response to the control signal, wherein the second operating system operates the PC in the second PDA mode; accessing the Internet; identifying an Internet radio broadcast station; and accessing the station.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
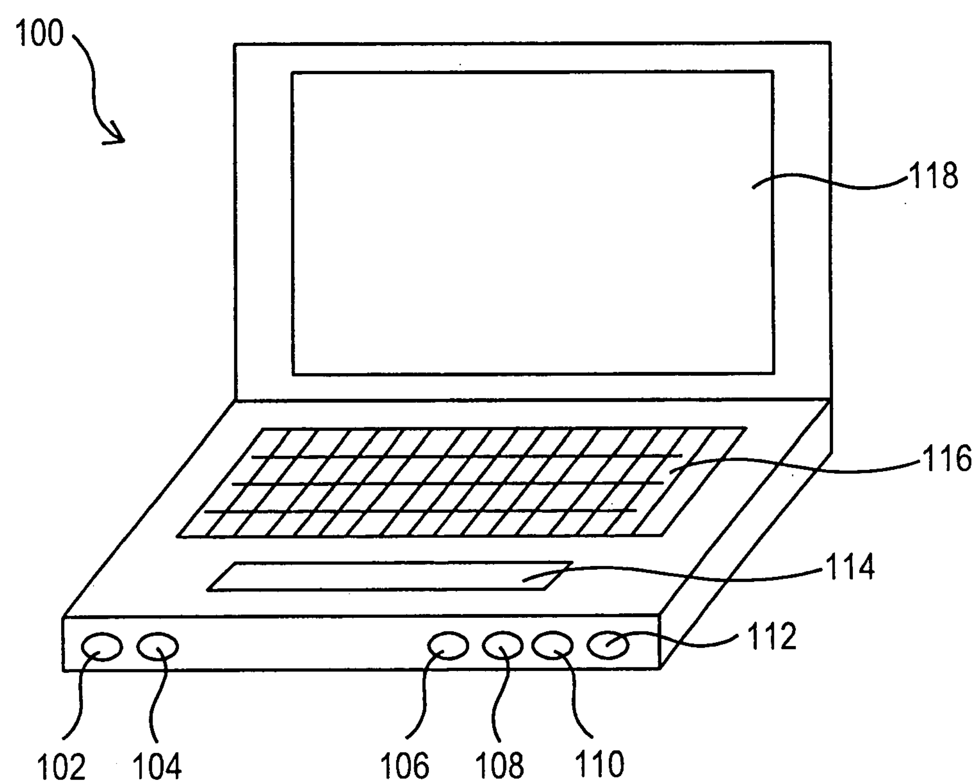
FIG. 1 is a perspective view of an exemplary PC integrated with PDA functionality.

Turning to FIG. 1, a perspective view of a PC 100 consistent with the invention is illustrated. The PC may be a laptop computer as illustrated in FIG. 1 or a desktop computer. For purposes of distinction, a laptop is configured to operate as a portable device and has a stand alone power source while a desktop is configured to operate as a stationary device and does not typically have a stand alone power source.

Advantageously, a PC consistent with the invention is configured to operate in both a PC mode and a PDA mode. In the PC mode, a first operating system, e.g., a PC operating system such as Windows® provided by Microsoft, Inc, of Redmond, Wash., is run. As such, the PC 100 operates as such and can perform any and all of the PC's functions such as word processing, email, Internet access, etc. In PDA mode, a second mini operating system is run. Such a mini operating system (Mini-OS) generally has fewer instructions and takes up less memory than the PC operating system. Such a Mini-OS may be similar to Palm OS® provided by Palm Inc. of Santa Clara Calif., PocketPC provided by Microsoft, Inc. of Redmond, Wash., or MontaVista Linux® provided by Monta Vista Software, Inc, of Sunnyvale, Calif. Such a Mini-OS may take up much less memory than that required for the first operating system such as Windows®. When operating in PDA mode, the Mini-OS and related PDA application software is utilized to provide a smaller subset of PDA functions when compared to PC functions.

Advantageously, booting the Mini-OS for operation in PDA mode takes significantly less time than booting the first operating system for operation in PC mode. This is due in part to the Mini-OS having a smaller kernel and hence a simpler boot up routine than its counterpart PC operating system. This allows a user to access a host of PDA applications much faster than waiting for the longer boot up routine for the first operating system. The Mini-OS may take only a few seconds or less to boot, while the first operating system may take as long as minutes to boot. As such the boot up sequence for the first operating system can be as least five times longer than the boot up sequence for the second operating system, e.g., the Mini-OS.

While in PDA mode, video data may be output on a second video display 114, e.g., a PDA display screen which may be a small LCD module, to display characters and graphics for different PDA applications. The PDA display screen 114 is smaller in size or surface area than the full display screen 118 which is typically utilized when operating the PC in PC mode. The PDA display screen 114 permits power savings since the entire full display screen 118 is not needed when the PC 100 is operating in PDA mode. However, PCs that are not concerned with such a power savings feature or desire the larger display screen 118, may utilize the full screen 118 in PDA mode. Elimination of the PDA display screen would also reduce initial PC 100 costs.

A PC 100 consistent with the invention may also be provided with PDA buttons 106, 108, 110, 112 to complement typical keys found in a conventional keyboard 116. Four buttons 106, 108, 110, 112 are illustrated in FIG. 1, although there maybe any number of buttons depending on the desired functionality. These PDA buttons 106, 108, 110, 112 are similar to the PDA buttons on most PDAs enabling the user to control the PC 100 in PDA mode by using the provided buttons 106, 108, 110, 112 to bring up different PDA applications or screens. The buttons 106, 108, 110, 112 may be any type of buttons such as mechanical push buttons, slide buttons, dial buttons, electrical buttons, etc.

The Mini-OS may be triggered to operate in a variety of ways. For instance, an input device may provide an input mode signal to the PC indicating desired operation in PC mode or PDA mode. One exemplary input device may be power control buttons 102, 104. The first button or PC power on button 102 may be used to initiate a regular boot up sequence of the PC 100 in the PC mode by loading a PC operating system. The second button or PDA power on button 104 may be used to initiate the loading of the Mini-OS for operation in PDA mode. One power button may also be used that could distinguish a PC mode power up request from a PDA mode power up request depending on the time the power on button is depressed. Another way to trigger the loading of the Mini-OS is by coupling electronic devices, e.g., digital cameras, digital camcorders, and the like, to the PC 100 for downloading of digital information.

A traveler who may otherwise travel with a laptop and a PDA may advantageously only take the laptop and still have PDA functionality. Since the PDA functionality is incorporated into the PC 100, it provides a direct link to the PC 100 and various systems of the PC. Hence, coupling of the PDA to a separate PC for transfer of data there between may be avoided. Such a PC 100 also gives the PDA applications access to the PC's more powerful processing circuit and larger mass storage devices, e.g., a hard disk drive, for new PDA applications that could not be supported by a PDA alone.

Figure 2:
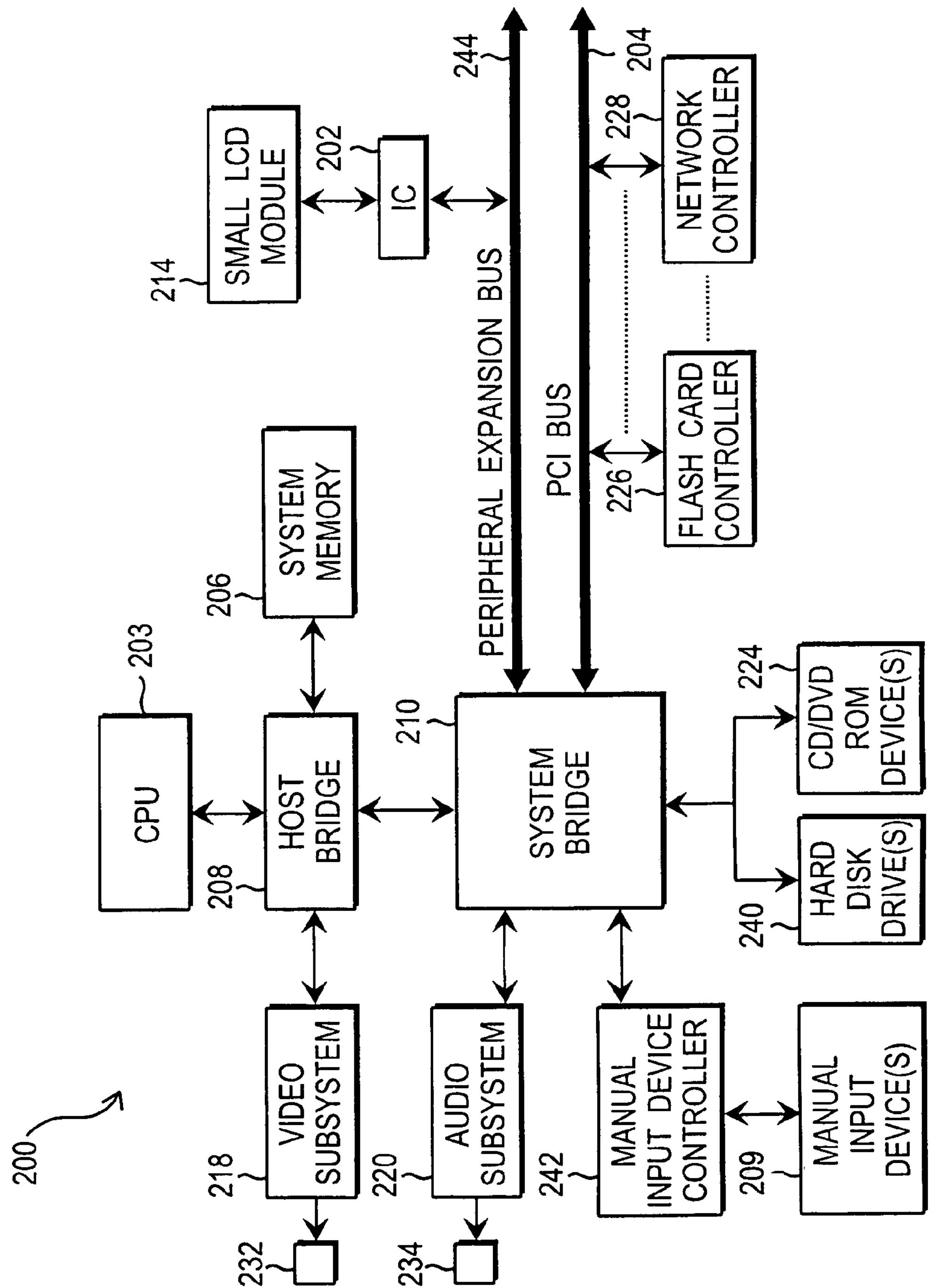
FIG. 2 is a block diagram of a PC consistent with the invention including an integrated circuit (IC) configured to provide PDA functionality to the PC.

Turning to FIG. 2, a simplified block diagram of a PC 200 consistent with the invention including an integrated circuit (IC) 202 configured to provide PDA functionality to the PC is illustrated. The IC 202 is shown directly coupled to the Peripheral Expansion Bus 244, which could be a variety of I/O buses in the PC 200 such as the Universal Serial Bus (USB), High Speed Serial Bus (IEEE 1394), Low Pin Count (LPC) bus, System Management Bus (SMBus), or even the PCI Bus 204. The functionality of the IC 202 may also be embedded in a host of other circuits, e.g., in an embedded keyboard controller or any other manual input device controller 242.

The PC 200 includes a central processing unit (CPU) 203. An exemplary CPU may be, for example, a Pentium processor available from Intel Corporation for executing instructions and controlling operation of the PC 200. The CPU 203 may be coupled to system memory 206 in a conventional manner through the host bridge 208. In turn, the host bridge 208 may be further coupled to the system bridge 210 and PCI bus 204 in a conventional manner. A manual input device controller 242 allows a user to input data to the PC 200 through manual input devices 209 such as a keyboard, mouse, joystick, touch-pad, infrared remote control, and PDA buttons 106, 108, 110, 112 as earlier detailed. The manual input device controller 242 may also be coupled to the PC power on button 102 and PDA power on button 104 functioning as input devices to provide an input signal to the PC indicating desired operation in either PC mode or PDA mode. The PCI bus 204 may be directly coupled to a variety of different controllers for controlling operation of associated peripheral devices. For example, a flash card controller 226, a network controller 228, and others may be directly coupled to the PCI bus 204.

The PC 200 may also include a video subsystem 218 and an audio subsystem 220 which are coupled to the processing circuit 203. A CD/DVD ROM drive 224 may be directly coupled to the system bridge 210 through an integrated drive electronics (IDE) bus in a conventional manner. The drive 224 is configured to read digital data from an external digital storage medium such as a conventional audio CD for audio applications or a conventional DVD for video applications.

The video subsystem 218 and the audio subsystem 220 contain a variety of circuits known to those skilled in the art for interfacing audio and video data with the processing circuit 203 through the system bridge 210 and host bridge 208 such that proper video and audio output can be played on a video output device 232 and audio output device 234 respectively. The video output device 232 may be a CRT, LCD matrix display or the like, while the audio output device 234 may be speakers, headphones, and the like.

An audio input device, e.g., a microphone, may be utilized to input audio data to the audio subsystem 220. The audio and video data to be displayed on the output devices 232, 234 may be obtained from a number of sources including system memory 206, CDs, DVDs, through electronic networking connections from other electronic storage sources, or from the audio input device.

The PC 200 receives power from a power source (not illustrated). For a desktop computer, the power source is typically conventional 120-volt AC power, which is converted to DC power by appropriate AC/DC converters. For a laptop, the power source may be a variety of standalone power sources such as a battery, solar cell, or the like. Batteries may include rechargeable batteries such as lithium, nickel-cadmium, or nickel-metal hydride.

Figure 3:
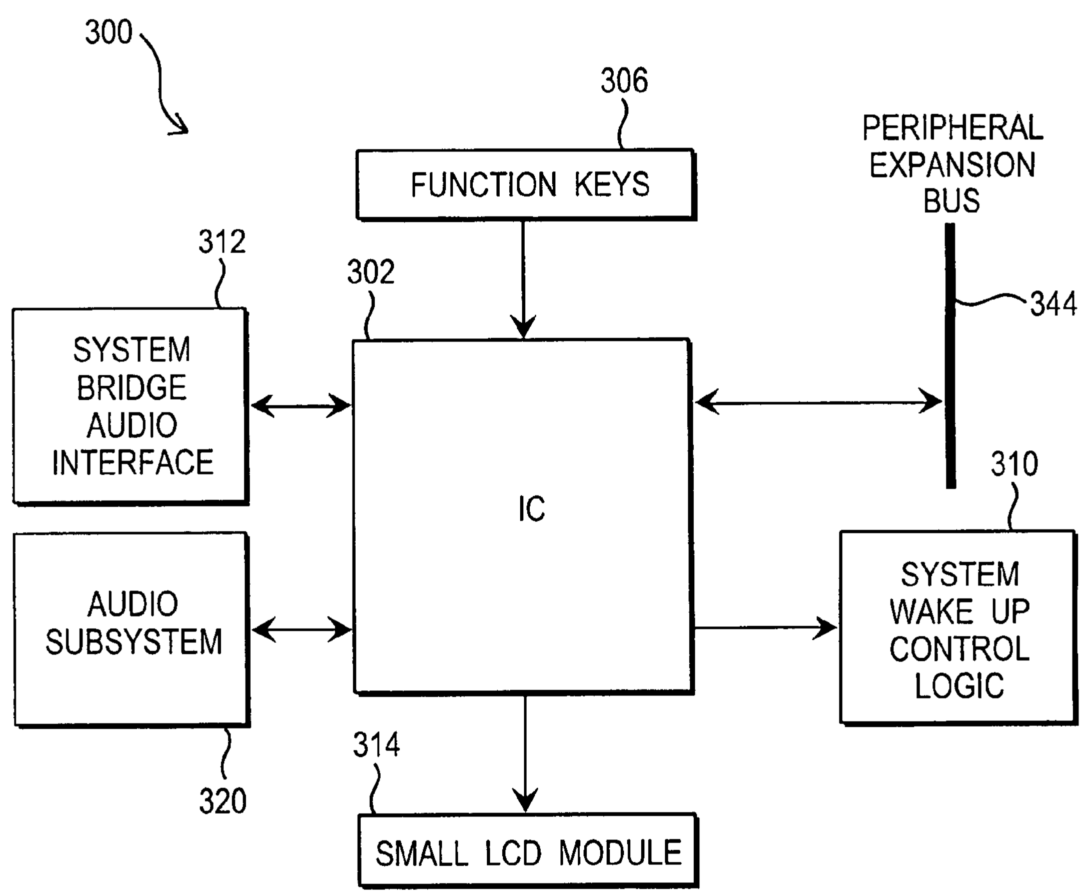
FIG. 3 is a block diagram of one exemplary embodiment for integrating an IC consistent with the invention into a PC to provide PDA functionality to the PC.

Turning to FIG. 3, a block diagram of one exemplary embodiment for integrating an IC 302 consistent with the invention with various PC components of a PC to provide PDA functionality to the PC is illustrated. In general, the IC 302 may be configured to receive input instructions from the function keys 306, to drive a small LCD module 314, and to control the audio interface 312 between the system bridge and the audio subsystem 320 to generate sound effects. The function keys may be the PDA buttons 106, 108, 110, 112 as earlier detailed enabling a user to bring up different PDA applications or screens when the PC is in operating in PDA mode.

As different function keys 306 are activated, an LCD controller interface of the IC send instructions or commands to the small LCD module 308 for different visual effects such as blinking and scrolling to meet different PDA application requirements. Since the LCD module 314 has a surface area that is less than the surface area of the normal size display screen 118, it permits power savings compared to its larger display counterpart 114 typically used in PC operating mode. In addition, further power savings may be realized by having the IC 302 store information in its internal memory, and shutting down the rest of the PC system utilizing the control logic interface 310. Again, the small LCD module 314 may not be required if the larger display screen 118 as illustrated in FIG. 1 is used to display characters and graphics for different PDA applications.

Figure 4:
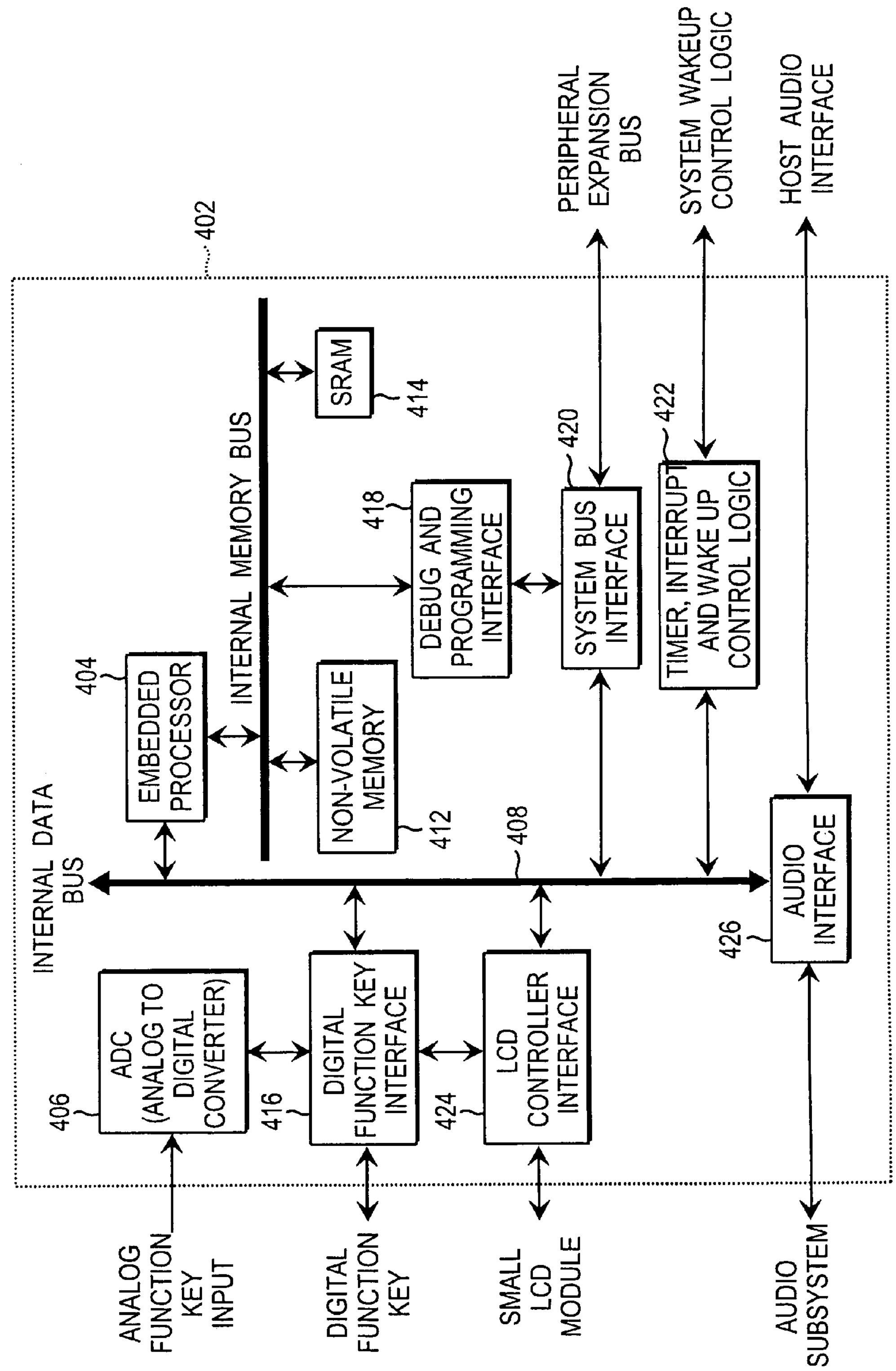
FIG. 4 is a block diagram of one exemplary embodiment of an IC consistent with the invention.

Turning to FIG. 4, one exemplary embodiment of an IC 402 consistent with the invention is illustrated. Those skilled in the art will recognize that there are many other embodiments that may also be implemented in an IC 402 consistent with the invention. The IC 402 may include an embedded processor 404 that functions as the central processing unit for the IC 402. The processor 404 executes commands in the non-volatile memory 412 and controls other internal IC components to perform necessary functions. The non-volatile memory 412 can be EEPROM, Flash Memory, or any type of solid-state memory. Such memory 412 stores programs for the embedded processor 404. The memory 412 content can be changed or reloaded by the PC system through the system bus interface 420.

Random Access Memory (RAM) 414, e.g., Static RAM (SRAM), may be used to store temporary data or information for the embedded processor 404. A debugging and programming interface 418 may be used by the PC system to control the IC 402 to perform debugging operations or to load new programs in the non-volatile memory 412. Security logic may also be required to prevent any unwelcome attempts to control the IC 402.

An analog to digital converter (ADC) 406 may be used to accept an analog function key input. Such an analog key input may be generated by any variety of analog input devices such as mechanical slide or dial buttons. For example, the PDA buttons 106, 108, 110, 112 may be such buttons. The ADC 406 converts the analog signal to a digital signal and provides the digital signal to the digital function key interface 416, which performs function key decoding.

The digital inputs to the digital function key interface 416 may be originated from the digital function keys or from the ADC 406. The keys may be decoded and sent to the embedded processor 404. If the ADC 406 is utilized, the digital function key interface 416 can be used to generate the key output to the system digital function keys. The keys can be sent to the keyboard controller in the system and generate the scan code for the OS under PC mode.

The LCD controller interface 424 may be used to send video data to the LCD controller on the small LCD module. A generic serial interface may be provided so that the LCD Controller Interface 424 can support different LCD controller vendors. The audio interface 426 may be used to generate the appropriate handshakes between the IC 402 and the audio subsystem during PDA mode. In the PDA mode, the host audio interface signals will be blocked. However, in PC mode, the system host audio interface controls will be directly passed to the audio subsystem 426.

Figure 5:
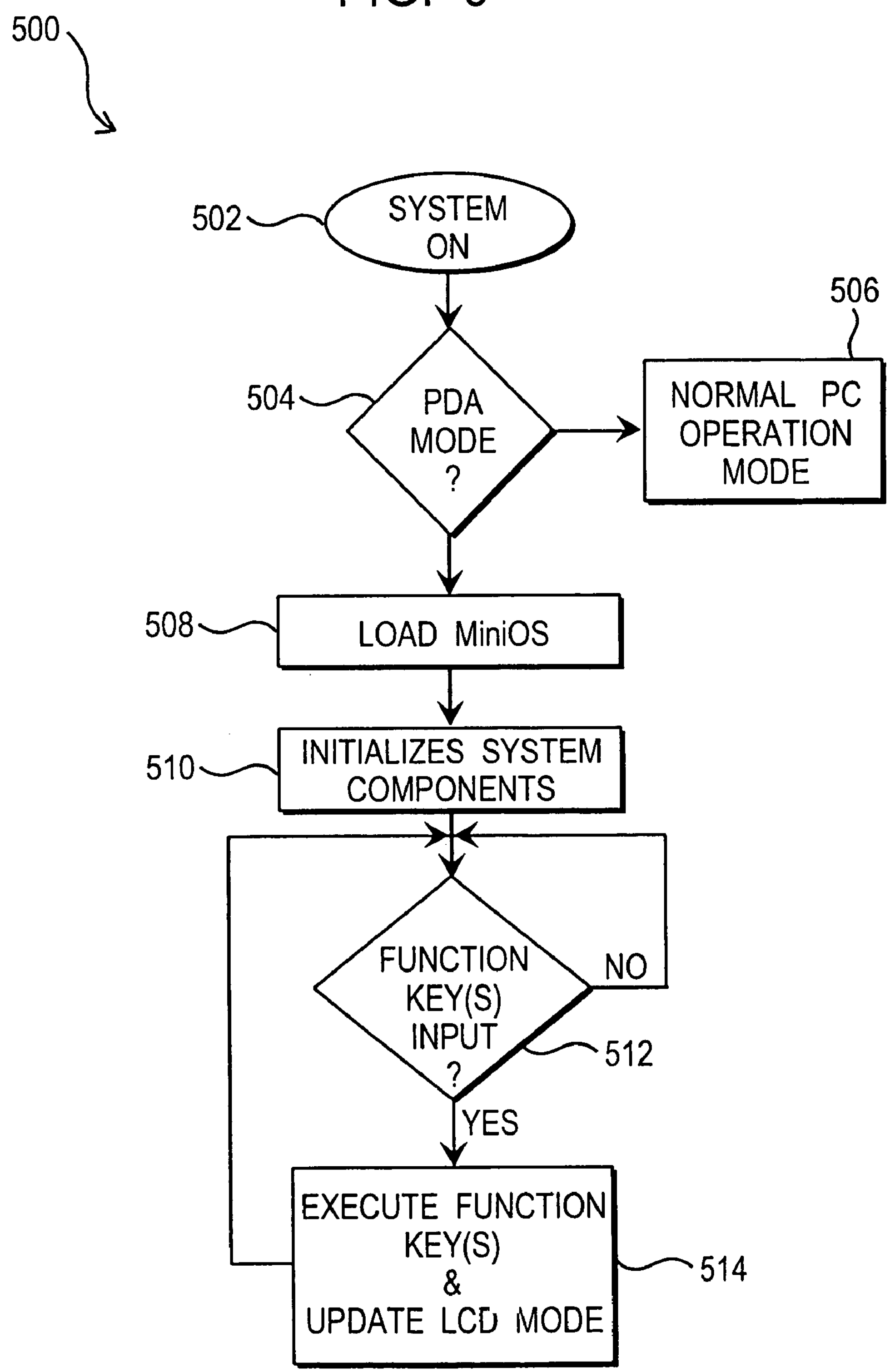
FIG. 5 is a flow chart of an exemplary power up of a mini operating system and initiation of PDA functions in one embodiment of the present invention.

Turning to FIG. 5, in conjunction with FIGS. 3 and 4, an exemplary sequence 500 for the power up of the mini-OS and initiation of PDA functions is illustrated. As illustrated at step 502, the sequence 500 begins when the system is turned on. In step 504, a determination is made whether the PDA operating mode is desired or not. This determination may be made in a number of ways by providing an input mode signal to the PC indicative of the desired operation mode. In one way, the PC may be equipped a PC power on button 102 and a PDA power on button 104 as illustrated in FIG. 1 so that if a user activates the PDA button, it is determined that the PDA mode is desired. Alternatively, if a user activates the PC power up button 102, it is determined that PC mode is desired and the system boots to normal PC operation mode at step 506. Another way of determining whether PDA mode is desired is by automatically booting up the PC in PDA mode if an external digital device, e.g., a digital camera or camcorder is coupled to the PC for downloading of data. Yet another way to determine whether PDA mode is desired is by utilizing the timer control logic 422 portion of the IC 402 to trigger the PDA mode after a certain predetermined time has elapsed. In addition, yet another way to determine whether PDA mode is desired is by utilizing an application program or an operating system that provides such capability.

Once it is determined that the PDA mode is desired, the Mini-OS is loaded 508 in the PC system's memory 206, which may include its RAM. In the next step 510, the mini-OS initializes the system components including one or more of the CPU 203, host bridge 208, system memory 206, and IC 202. The system then waits for input from one of the function keys in the next step 512, until one of the function keys 306 is activated. At this point, the appropriate function is executed and the LCD display module 314 is updated, as appropriate, at step 514. Input signals may also be sent via the conventional keyboard 116 in some instances where so desired, and the output video display is preferably only via the PDA display 114, but may also be on the larger conventional display 118.

Those skilled in the art should recognize that although some of the above-described embodiments utilize a hardware-based OS selection, e.g., by activating the PC power up button 102 or the PDA power up button 104, other OS selection methods are contemplated as well. Such selection methods include, e.g., using a batch file or other scripting software-based method to shut down a first OS and boot to the second OS. Those skilled in the art will also recognize that the Mini-OS of the present invention could conceivably be implemented as part of a larger OS, e.g., a GUI-based OS, such as Windows®, LINUX, etc, or as a software component named something other than an "operating system," e.g., a "driver", an "algorithm", a "script", a "code", a "program", a "routine", a "subroutine", a "utility", etc, instead of being implemented as an entirely separate operating system. Such embodiments are contemplated to be within the scope of the present invention.

Those skilled in the art will also recognize a variety of software applications that may be utilized in the PDA operating mode that provide improvements over that found in traditional PCs or PDAs. Ten such applications include: 1) instant internet access; 2) wireless internet access; 3) scheduling applications; 4) address book applications; 5) low cost storage area for various digital devices; 6) voice recording applications, 7) remote access, 8) internet auction applications, 9) email applications, and 10) internet radio applications. Each of these is addressed in more detail below. Again, this exemplary list is not exclusive and those skilled in the art will recognize a variety of other similar applications where the PDA operating mode of a PC consistent with the invention will provide improvements over that found in traditional PCs or PDAs.

1. Instant Internet Access

With a traditional PC that is off or in a low power state, a user wishing to download information from the Internet must boot up the PC, invoke the internet browser, select the appropriate web site, search the web site for selected materials, and load it into the PC. With a PC including an instant Internet access software application consistent with the invention, the above steps may be simplified. For instance, the computer user may preset web site addresses and selected materials such as news, sport events, weather, stock prices, etc. that the user requires on a more frequent basis when the PC is operating in PC mode. When the PC is off or in a low power state, the user may power up using the PDA power on button 104 that boots the PC very quickly compared to the PC boot up process. The instant Internet software application including the pre-selected web materials instructs the system to the pre-selected web sites and downloads the selected materials if Internet access to the web site is available. The LCD module 314 may display the information downloaded from the various web sites.

The required information to be downloaded from the web site may also be preset in the web site directly. In this case, an identification and authentication process may be required for the web site to properly identify a user. This could be done automatically between the web site and the application software, or by using security devices such as smart cards if highly confidential information is desired. Since the PC accesses the Internet for only a very short period of time in this PDA mode access instance, the non-essential PC components can be automatically turned off after information from the web site is downloaded to conserve power. However, the LCD module 314 may still have power to display the downloaded information which is stored in its internal memory buffer until the system wakes up again after receiving a wake up signal from system wake up control logic 310. Once the PC is woken up, new information from web sites may be downloaded and updated into the internal memory buffer of the LCD module 314.

A similar concept may also be applied to other applications such as downloading emails and instant messages. Application software can also program internal registers of the IC 302 to wake up the PC periodically to get the latest information, emails, or messages.

The audio interface 312 can also be used to provide text-to-voice capability so that end users can listen to emails, messages, or news data without looking into the LCD module 314.

2. Wireless Internet Access

A PC consistent with the invention in PDA mode can also deploy wireless applications such as Bluetooth or 802.11 to access other devices or networks. The PC can boot up in the PDA mode and a wireless internet access software application may enable a user to download emails from a local file server through a wireless Local Area Network (LAN) or the Internet. The user may then use the function keys 306 to print out the emails from a wireless printer.

3. Scheduling Applications

Most PDAs and PCs have a scheduling application that may also be used to provide reminders to a user about previously scheduled events or meetings. The reminder may be an alert message or an audible sound alerting the user that the event or meeting is coming up. However, for such reminder applications to properly function in a traditional PC, the PC has to be kept ON to keep the reminder feature functional. When the PC is a laptop, it would be impractical for battery life to keep the laptop ON solely for this function due to the limited battery capacity. In desktop PCs keeping the desktop on solely for this reminder function would be a drain on power consumption and may also cause an annoying noise from cooling fans of the desktop PC.

Advantageously, scheduling information including dates and times for reminders to issue may be preloaded into the IC 402 and stored in the memory 412 or 414 of the IC 402. As such, the PC may in a deep sleep mode. Internal clock and timer logic 422 may be used to keep track of the date and time when the system is off or in a low power mode. When the scheduled time for a reminder is reached, the IC 402 can generate an audible tone or beep through the audio subsystem 320 or the IC 402 can wake up the system and deploy the scheduling software in PC mode. As such, an IC 402 consistent with the invention can provide an efficient way to use a scheduling software application. This is especially true for users who travel with a laptop.

4. Address Book Applications

Most PDAs provide contact information or address book software applications enabling a user to store people's contact information such as name, address, phone number, email, etc. A PC having a PDA mode consistent with the invention provides an easy interface for this type of application. When a user wishes to access or find any of the contact information, the user may turn on the PC in PDA mode, e.g., by activating the PDA power on button 104. Function keys 306 may then be used to ask for the contact information database. Then, the system can load the contact information database into the PC's system memory 206 and let the user search through the database. The system power can be shut down when the search is complete. Since the IC 302 does not need to store any contact information directly, it reduces the die size and cost of the chip. Accordingly, a PC consistent with the invention provides a cost effective solution enabling fast searching of contact information.

5. Storage Hub for Digital Devices

A variety of digital devices such as digital cameras, digital camcorders, portable music players, digital recorders, or the like may store digital data on a variety of storage devices such as flash media cards. Some types of flash media cards include SmartMedia™, CompactFlash™, and Memory Stick® cards. When the flash media card is fill, the user typically either removes the full flash media card and inserts a new empty flash media card, or may download the data to an electronic device, e.g., PC, to provide extra room for additional data. Using a PC consistent with this invention, a user may boot up the PC in PDA mode by either using the PDA power up button 104 or the PDA mode may automatically be boot up by coupling the digital device to the PC for downloading.

The user may then utilize a storage software application to select an import function to import the digital data from the digital device to a mass storage device. The mass storage device may be the hard disk drive 240 of the PC or a variety of other storage devices coupled to the PC via a local area network (LAN) or storage area network (SAN). The status of the import function may be displayed on the LCD module 314. After the data is imported from the digital device, the user may erase the associated storage device or flash media card for the next usage. As such, the storage software application provides a simple and easy interface for end users to import digital data without waiting for a long boot up time in PC mode. It also enables the end user to have access to large PC mass storage devices so that the user can avoid paying for additional digital device storage devices or flash media cards. For example, if the digital device is a digital camera, a user can quickly download digital images stored on the digital camera's flash media card to the PC in the PDA mode. The PDA mode may be automatically triggered when the user couples the digital camera to the PC. The user can change, edit, or process the digital images later in the PC mode.

6. Voice Recording Applications

Voice recording software applications can be quickly provided in PDA mode without the long boot up time of PC mode. For such voice recording applications, an audio input device, e.g., a microphone, can be utilized by an end user to input voice data, which may then be sent to the audio subsystem 320. The voice data will pass to the IC 302 and it may be stored in system memory 206. The CPU 203 may then retrieve the voice data from system memory 206 and utilize a variety of voice coding techniques know to those skilled in the art to perform voice data compression. The final output may then be sent to a mass storage device, e.g., hard disk drive 240, of the PC or it may be sent to a flash media card of an associated voice recorder and player. The status of voice recording such a recording time may be displayed on the LCD module 314. Again, such a voice recording application can be quickly provided in PDA mode without the long boot up time of PC mode.

7. Remote Access

Remote access software applications may programmed so that a PC in PDA mode can send important information such as urgent emails, alert messages, stock market information, etc., to a mobile terminal, e.g., a mobile phone. The information may be sent through a phone line or network cable which is connected to the PC system. This allows the user to access any important messages or information from the user's mobile phone regardless of the location of the PC. A similar concept can also be utilized to allow a mobile terminal to control the PC to access information that the user desires.

8. Internet Auction Applications

There are a variety of Internet portals that provide an electronic type marketplace for buyers and sellers. One such Internet portal offers an on-line auction whereby a seller promises to sell selected merchandise to a buyer with the highest bid or offer during a specified auction time interval. For instance, one such Internet portal is offered by eBay, Inc. of San Jose, Calif. During an auction time interval, a bidder or offer or in a typical auction monitors bids to determine how their latest bid compares to other third party bids. If a third party offers a bid higher than a user's latest bid, such a user may elect to re-bid in order to have the highest bid and purchase the desired merchandise. Such a process typically requires the user to periodically check the latest bid prices during the specified auction time interval.

Figure 6:
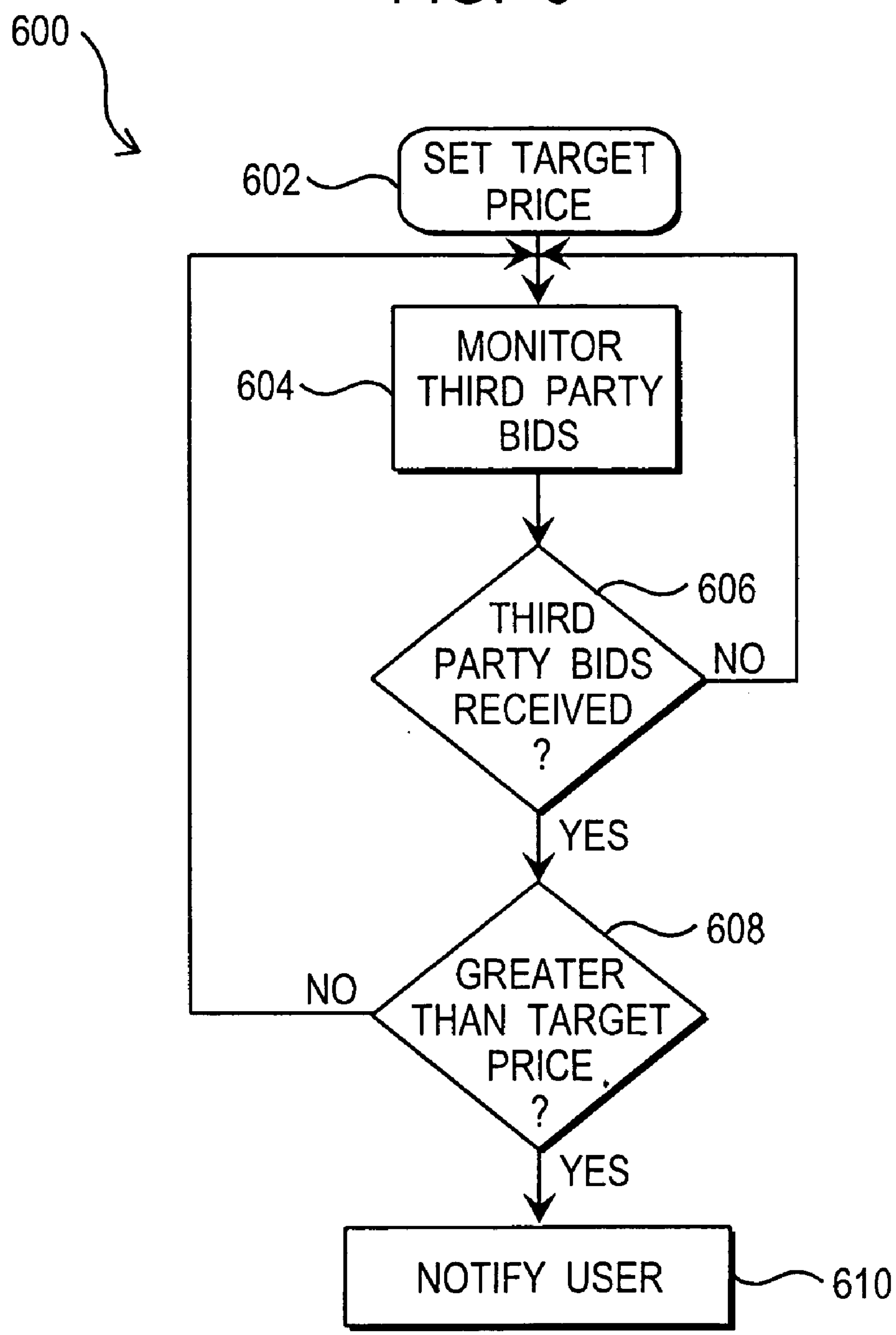
FIG. 6 is a flow chart of an exemplary sequence for Internet auction application software consistent with the invention.

A PC consistent with the invention may provide a user-friendly interface to monitor such an auction process using Internet auction application software. Turning to FIG. 6, an exemplary sequence 600 for such an Internet auction software application is illustrated. In step 602, a target price is set. The target price may be manually set by a user or automatically set based on a user's bid price. In step 604, the Internet auction application monitors whether any third party bids were received on the particular item of interest. The software may continually or periodically monitor third party bids. If it periodically monitors such bids, the PC may advantageously be in a low power mode if the PC user is not utilizing any other PC or PDA application programs.

If a third party bid was received, the software analyzes whether such third party bid is greater than the target price 608. If not, no notification is given and the system continues to monitor third party bids until the particular auction time interval has expired. If a third party bid was made that is higher than the target price set in step 602, notice is given 610 to the PC user. Such notification may take a variety of forms such as audio notification, e.g., an audio alarm, or video notification, e.g., a particular display on the PDA display screen 114. As such, a user may engage in other activities without having to continuously monitor the dynamic bidding process.

9. Electronic Mail Applications

Electronic mail (e-mail) is highly prevalent in today's society. For a desktop or laptop computer user, accessing e-mail typically requires a user to boot up the desktop or laptop and view the body or text of e-mail messages one-by-one. Advantageously, a PC consistent with the invention may have e-mail application software that allows a user to access and filter recent e-mail messages even when the PC is initially in a power off or low power state.

Figure 7A:
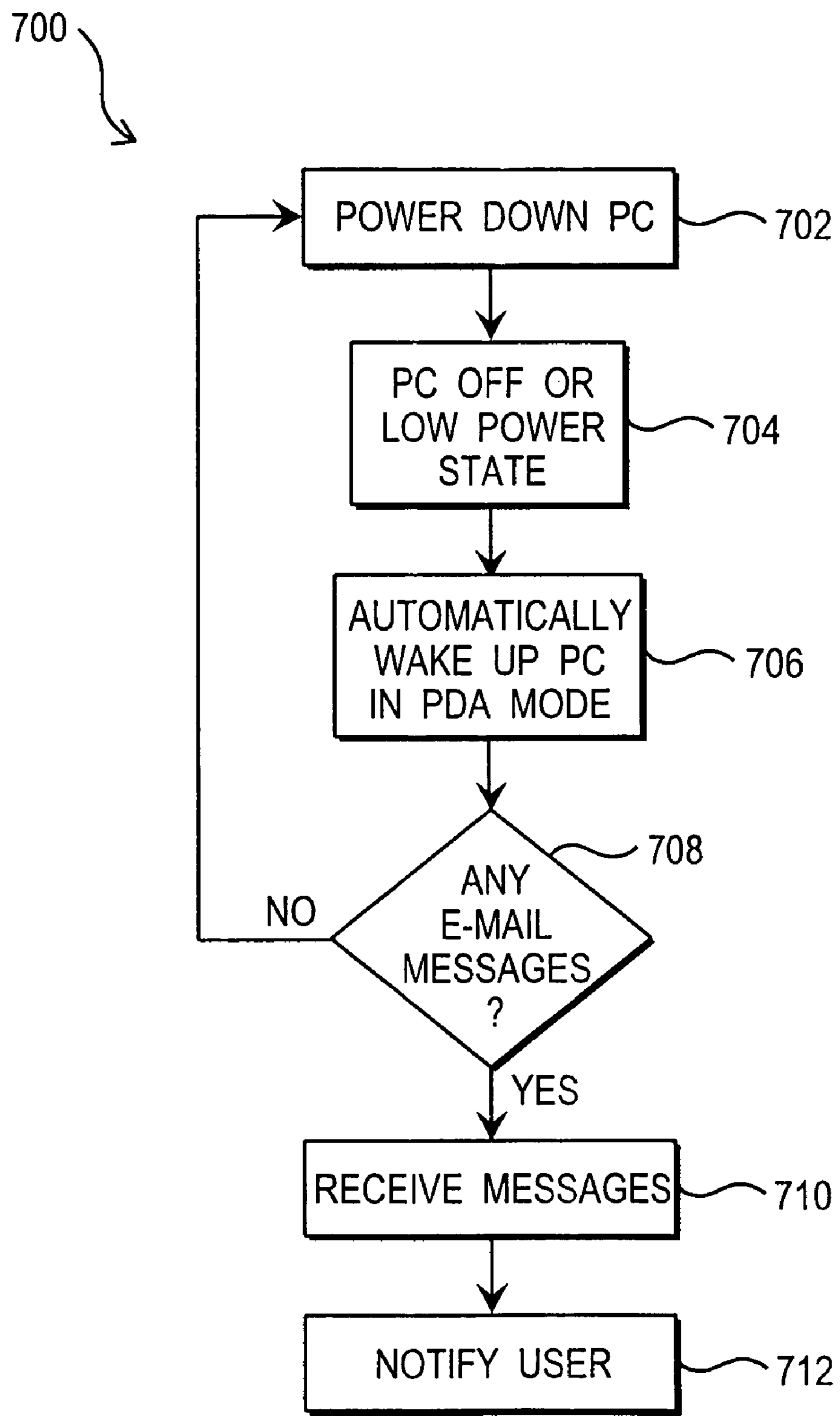
FIG. 7A is a flow chart of one exemplary sequence for electronic mail application software consistent with the invention.

Turning to FIG. 7A, an exemplary sequence 700 for such e-mail application software is illustrated. First, the PC may be powered down 702 such that the PC is off or in a low power state 704. A low power state may be for example global system state G1 or soft off states G2/S5 as those states are defined by the Advanced Configuration and Power Interface (ACPI) Specification, Revision 2.0a of Mar. 31, 2002, Copyright Compaq Computer Corporation, Intel Corporation, Microsoft Corporation, Phoenix Technologies Ltd., and Toshiba Corporation. The global system state G1 or sleeping state may also further contain a variety of sleeping states S1, S2, S3, S4, and S5 as are also defined in the ACPI specification.

The e-mail application software may then automatically wake up the PC 706 in PDA mode. This may be done in a variety of ways, e.g., the e-mail application software may program the internal registers of the IC 302 to wake the PC periodically after a predetermined time interval has expired so that it may periodically obtain the latest information such as e-mail messages. When the PC is woken up, it is in a power state high enough to receive e-mail messages and to possibly screen such messages as further detailed to FIG. 7B. Such a woken up state may be global system state G0 as defined by the ACPI specification or some lesser state with enough power to perform the stated tasks. The PC in such a woken up state consumes more power than the PC in its power off or low power state.

Once the PC is woken up and is operating in PDA mode, the e-mail application software checks for any e-mails messages in step 708. If no e-mails were received, the software instructs powering down of the PC again 702 into an off or low power state 704 until it is automatically woken up the next time. If at least one e-mail message is present from the applicable source, e.g., the particular e-mail server or servers, then such message or messages are received in step 710. Once an e-mail message is received, the software may then trigger the PC to notify the user in step 712. As with the Internet auction application, notification may take a variety of forms such as audio notification, e.g., an audio alarm, or video notification, e.g., a particular display on the PDA display screen 114.

Figure 7B:
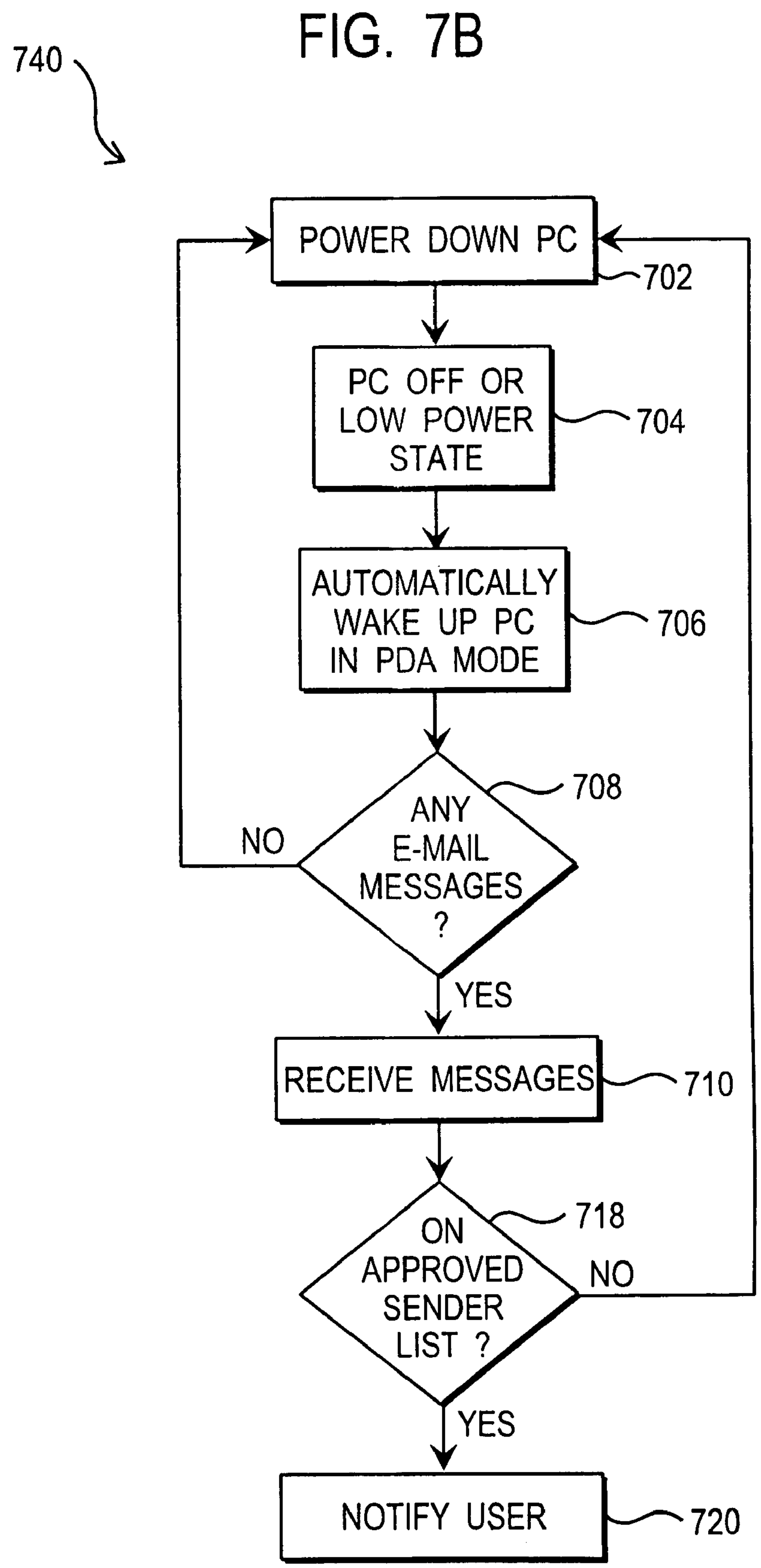
FIG. 7B is a flow chart of another exemplary sequence for electronic mail application software consistent with the invention having an additional screening process for incoming e-mail messages.

Alternatively to providing immediate notification of any received e-mail message, the e-mail application software may provide a filtering or screening type function as illustrated in the exemplary sequence 740 of FIG. 7B. Steps 702, 704, 706, 708 and 710 of FIG. 7B are similar to those previously described steps detailed with reference to FIG. 7A and hence repetitive description is omitted herein for clarity. Once any e-mail message or messages are received in step 710, the software may then analyze whether the sender of such message or messages is on an approved sender list 718. The identity of the sender may be extracted from analyzing the envelope portion of the e-mail message. The approved sender list may be manually created by the end-user and stored in an appropriate table in various memory portions of the PC. The list may also be automatically updated by adding the identity of any person to whom a user has sent an e-mail message since it is likely a return message from such party is expected at some time.

If the sender of the e-mail message is not included in the approved sender list in step 718, no notification would be given to the end-user and the software instructs powering down of the PC again 702 to an off or a low power PC state 704 until it is automatically woken up the next time. If the sender of the e-mail message is included in the approved sender list, the software would instruct the PC to notify the user in step 720. Such notification may take a variety of forms such as audio notification, e.g., an audio alarm, or video notification, e.g., a particular display on the PDA display screen 114. As such, the e-mail application software may selectively filter incoming e-mail messages and provide a user with timely notification for messages from select senders even when the PC is initially in a power off or low power state.

10. Internet Radio Applications

Accessing various broadcast stations, e.g., certain radio stations, via the Internet has become a popular way to listen to certain stations for computer users. However, to listen to Internet radio, the computer user must boot up the computer and open several different windows before listing to the desired broadcast. The access time and complexity is much greater than a traditional AM/FM radio.

In a PC consistent with the present invention capable of operating in a PC and PDA mode, an end-user may preset selected materials such as Internet radio stations into memory of the PC when the PC is operating in PC mode. When the PC is off or in a low power state, the user may power up the PC in PDA mode via one of a variety of methods. If the PC required a boot up sequence to restart, the PC would boots up quickly in the PDA mode compared to the PC mode. The Internet radio application including pre-selected broadcast stations may then be accessed by the end-user in order to gain quick and simple access to such broadcast stations if access to such stations if available via the Internet.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A personal computer (PC) adapted to function as a personal digital assistant (PDA) comprising:

a central processing unit (CPU) responsive to a control signal to load a first operating system or a second operating system, wherein said first operating system is run by said PC in a first PC mode and said second operating system is run by said PC in a second PDA mode, and wherein said PC operating in said second PDA mode operates a plurality of PDA software applications selected from the group consisting of: Internet access application, wireless Internet access application, scheduling application, address book application, storage software application, voice recording application, Internet auction application, electronic mail access application, and Internet radio application; and an integrated circuit coupled to said CPU operable for receiving an instruction signal from a function key to enable execution of said plurality of PDA software applications, wherein said integrated circuit includes a LCD controller interface and an audio interface respectively for controlling a plurality of visual and audio effects associated with said plurality of PDA software applications according to said instruction signal if said PC operates in said second PDA mode, and wherein said audio interface is coupled between a system host audio interface and an audio subsystem of said PC for blocking signals from said system host audio interface if said PC operates in said second PDA mode, thereby controlling said audio effects.

2. The PC of claim 1, wherein said Internet auction application is configured to accept a target price and instruct said PC to provide notification if said target price is exceeded.

3. The PC of claim 2, wherein said target price is a bid price.

4. The PC of claim 2, wherein said notification is video notification.

5. The PC of claim 2, wherein said notification is audio notification.

6. The PC of claim 1, wherein said electronic mail access application is configured to instruct said PC to provide a notification if an e-mail message sent by a sender is received by said PC.

7. The PC of claim 6, wherein said notification is provided only if said sender is on an approved sender list.

8. The PC of claim 1, wherein said Internet radio application is configured to access an Internet radio station.

9. The PC of claim 8, wherein said Internet radio station has an internet location identity stored in a memory of said PC.

10. The PC of claim 1, wherein said PC is configured to operate in at least a first power state and a second power state, wherein said PC consumes less power in said second power state than said first power state, wherein said PC is initially in said second power state, and wherein said Internet radio applications are configured to initiate said control signal to wake up said PC from said second power state to said first power state, operate said second operating system in response to said control signal thereby operating said PC in said second PDA mode, access the Internet, identify an Internet radio broadcast station, and access said Internet radio broadcast station.

11. The PC of claim 10, wherein said first power state is a full power state and said second power state is a low power state or off state.

12. The PC of claim 11, wherein said full power state is global system state G0, said low power state is global system power state G1, and said off state is global system power state G2/S5.

13. The PC of claim 1, wherein said Internet auction applications are configured to initiate said control signal, operate said second operating system in response to said control signal thereby operating said PC in said second PDA mode, access an Internet auction portal, set a target price for a select auction, monitor a plurality of third party bid automatically in said PDA mode, compare each of said plurality of third party bids to said target price, and notify a PC user if one of said plurality of third party bids exceeds said target price.

14. The PC of claim 1, further comprising:

a liquid crystal display module controlled by said integrated circuit and operable for displaying said plurality of visual effects respectively associated with said plurality of PDA software applications if said PC operates in said second PDA mode, wherein a surface area of said liquid crystal display module is less than a surface area of a display screen used in said first PC mode.

15. The PC of claim 1, wherein said integrated circuit comprises a memory operable for storing commands and an embedded processor coupled to said memory operable for executing said commands to control said LCD controller interface and said audio interface.

16. The PC of claim 15, wherein said integrated circuit comprises a control logic interface coupled to said embedded processor operable for shutting down components of said PC unused in said second PDA mode according to information stored in said memory to save power.

17. The PC of claim 1, wherein said signals from said system host audio interface are passed to said audio subsystem to control said audio effects.

18. A method of monitoring a plurality of incoming electronic mail messages at a personal computer (PC), wherein said PC is configured to operate in at least a first power state and a second power state, wherein said PC consumes less power in said second power state than said first power state, and wherein said PC is initially in said second power state, said method comprising:

waking up said PC from said second power state to said first power state;

providing an instruction signal from a function key to an integrated circuit coupled to a central processing unit (CPU);

respectively controlling a visual effect and an audio effect associated with monitoring said plurality of incoming electronic mail messages by a LCD controller interface and an audio interface embedded in said integrated circuit according to said instruction signal;

blocking signals from a system host audio interface to an audio subsystem of said PC by said audio interface:

checking for any of said plurality of incoming electronic mail messages;

receiving any of said plurality of incoming electronic mail messages; and providing a notice indicating receipt of any of said plurality of incoming electronic mail messages.

19. The method of claim 18, wherein said waking up step occurs periodically after expiration of a predetermined time interval.

20. The method of claim 18, further comprising:

checking sender identification for each of said plurality of incoming electronic mail messages from said receiving step against an approved sender list; and providing said notice only if any of said plurality of incoming electronic mail messages has an associated sender on said approved sender list.

21. A method of monitoring a plurality of incoming electronic mail messages with a personal computer (PC) capable of operating in either a first PC mode or a second personal digital assistant (PDA) mode, wherein said PC is configured to operate in at least a first power state and a second power state, wherein said PC consumes less power in said second power state than in said first power state, and wherein said PC is initially in said second power state, said method comprising:

initiating a control signal to wake up said PC from said second power state to said first power state;

operating a second operating system in response to said control signal, wherein said second operating system operates said PC in said second PDA mode;

providing an instruction signal from a function key to an integrated circuit coupled to a central processing unit (CPU);

respectively controlling a visual effect and an audio effect associated with monitoring said plurality of incoming electronic mail messages by a LCD controller interface and an audio interface embedded in said integrated circuit according to said instruction signal;

blocking signals from a system host audio interface to an audio subsystem of said PC by said audio interface;

checking for any of said plurality of incoming electronic mail messages;

receiving any of said plurality of incoming electronic mail messages; and providing a notice indicating receipt of any of said plurality of incoming electronic mail messages if said PC is said PDA mode.

22. The method of claim 21, wherein said control signal is initiated periodically after expiration of a predetermined time interval.

23. The method of claim 16, further comprising:

checking sender identification for each of said plurality of incoming electronic mail messages from said receiving step against an approved sender list; and providing said notice only if any of said plurality of incoming electronic mail messages has an associated sender on said approved sender list if said PC is in said PDA mode.

24. The method of claim 21, wherein said first power state comprises a full power state and said second power state comprises a low power state or off state.

25. The method of claim 24, wherein said full power state comprises global system state GO, said low power state comprises global system power state G1, and said off state comprises global system power state G2

S5.

26. A method of operating a personal computer (PC) comprising:

loading a first operating system or a second operating system to a central processing unit (CPU) in response to a control signal;

running said first operating system in a PC mode;

running said second operating system in a personal digital assistant (PDA) mode;

operating a plurality of PDA software applications if said PC operates in said PDA mode;

providing an instruction signal from a function key to an integrated circuit coupled to said CPU to enable execution of said plurality of PDA software applications if said PC operates in said PDA mode;

respectively controlling a plurality of visual and audio effects associated with said plurality of PDA software applications by a LCD controller interface and an audio interface embedded in said integrated circuit according to said instruction signal if said PC operates in said PDA mode:

blocking signals from a system host audio interface to an audio subsystem of said PC by said audio interface if said PC operates in said PDA mode; and switching said PC mode and said PDA mode in response to said control signal, wherein said plurality of PDA software applications are software applications selected from the group consisting of: Internet access application, wireless Internet access application, scheduling application, address book application, storage software application, voice recording application, Internet auction application, electronic mail access application, and Internet radio application.

27. The method of claim 26, wherein said electronic mail access application is configured to instruct said PC to provide a notification if an e-mail message sent by a sender is received by said PC.

28. The method of claim 27, wherein said notification is provided only if said sender is on an approved sender list.

29. The method of claim 26, further comprising:

storing commands in a memory embedded in said integrated circuit; and executing said commands by a embedded processor in said integrated circuit to control said LCD control interface and said audio interface.

30. The method of claim 29, further comprising:

storing information associated with power saving in said memory; and shutting down components of said PC unused in said PDA mode according to said information stored in said memory.

31. The method of claim 26, further comprising:

passing said signals from said system host audio interface to said audio subsystem to control said audio effects if said PC operates in said PC mode.

* * * * *